United States Patent [19]

Hentschel

[11] Patent Number: 5,236,653
[45] Date of Patent: Aug. 17, 1993

[54] METHOD FOR PRODUCING A COLUMNAR SHAPED PIECE

[75] Inventor: Martin Hentschel, Mainbernheim, Fed. Rep. of Germany

[73] Assignee: Real GmbH, Mainbernheim, Fed. Rep. of Germany

[21] Appl. No.: 764,753

[22] Filed: Sep. 24, 1991

[30] Foreign Application Priority Data

Sep. 25, 1990 [DE] Fed. Rep. of Germany ....... 4030274

[51] Int. Cl.$^5$ .............................................. B29C 47/88
[52] U.S. Cl. ............................... 264/310; 156/244.11; 264/297.3; 264/323; 264/348
[58] Field of Search ............... 156/244.11, 500; 264/46.1, 45.9, 323, DIG. 69, 237, 310, 348, 297.3; 425/325, 327, 377, 391, 319

[56] References Cited

U.S. PATENT DOCUMENTS

| | | | |
|---|---|---|---|
| 2,414,097 | 1/1947 | Garvey et al. | 264/108 |
| 2,696,639 | 12/1954 | Meyer et al. | 264/103 |
| 3,121,130 | 2/1964 | Wiley et al. | 425/377 |
| 3,407,440 | 10/1968 | Myers, Jr. | 425/319 |
| 3,477,101 | 11/1969 | Fritsch | 425/325 |
| 3,857,914 | 12/1974 | Aishima et al. | 264/46.1 |
| 4,187,352 | 2/1980 | Klobbie | 264/323 |
| 4,738,808 | 4/1988 | Hammer et al. | 264/323 |
| 5,032,072 | 7/1991 | Heuschkel | 425/150 |

FOREIGN PATENT DOCUMENTS

| | | | |
|---|---|---|---|
| 2523467 | 12/1976 | Fed. Rep. of Germany | 425/377 |
| 2810003 | 10/1978 | Fed. Rep. of Germany | 264/DIG. 69 |
| 3341438 | 6/1985 | Fed. Rep. of Germany | |

Primary Examiner—Jeffery Thurlow
Attorney, Agent, or Firm—Sprung, Horn, Kramer & Woods

[57] ABSTRACT

A method of and device for producing a columnar shaped piece. A blend of essentially thermoplastic particles is melted into a billet, introduced into a mold, looped into layers inside the mold, and transformed into a piece, subsequent to which the piece is solidified by cooling and removed. The billet (3) is rotated essentially horizontally around its axis while it is being introduced into the mold (4) at one end and brought to rest inside the mold against the inner surface (6) thereof in the circumferential direction. The billet continues to be introduced until the inner surface is continuously and uniformly covered with constituents of the billet.

4 Claims, 4 Drawing Sheets

METHOD FOR PRODUCING A COLUMNAR SHAPED PIECE

BACKGROUND OF THE INVENTION

The invention concerns a method of producing a columnar shaped piece whereby a blend of essentially thermoplastic particles is melted into a flexible paste-like strand or billet, introduced into a mold, looped into layers inside the mold, and transformed into a piece, subsequent to which the piece is solidified by cooling and removed.

A method of this type is known from German Patent No. 3,341,438. The thermoplastic material melted in an extruder and transformed into a billet is expanded once it has left the extruder and comes to rest between two open-mesh belts departing from the extruder's outlet. The ratio of the speed at which the billet arrives to that at which the belts travel is adjusted to essentially match the ratio of the distance between the belts to the thickness of the billet. The density of the resulting slab of plastic foam will accordingly essentially equal that of the expanded billet. It is consequently low, and a slab of this type cannot be employed as a static bearing element. The moving belts also make the device needed to carry out the process complicated and sensitive. The products can also essentially only be slabs. Due to the impossibility of diverting heat more rapidly, the attainable rate of production is very low.

SUMMARY OF THE INVENTION

The principal object of the present invention is to improve a method of the aforesaid type to the extent that outstandingly strong columnar pieces of any desired cross-section can be produced comparatively rapidly.

This object, as well as other objects which will become apparent from the discussion that follows, are achieved, in accordance with the present invention, by rotating the billet essentially horizontally around its axis while it is being introduced into the mold and brought to rest inside the mold against the inner surface thereof in the circumferential direction, and by continuing the introduction of the billet into the mold until the inner surface is continuously and uniformly covered with constituents of the billet.

Various forces act on the billet while it is being introduced into the mold. The diameter of the billet is always less than that of the mold. Its forward end will accordingly, and due to its satisfactory plastic deformability subsequent to introduction into the mold, sag and come into contact with the latter's inner surface, resulting in a certain level of mutual adhesion. The billet will accordingly begin to rotate as well as advance. The subsequently introduced constituents of the billet will accordingly constantly and continuously be brought into contact along the circumference inside the mold, resulting in mutual adhesion, initially with the inner surface and then with the already deposited constituents of the billet until the available space between the deposited constituents and the outlet from the extruder is completely occupied. The billet, as it continues to enter in the same mode will now occasion a relative displacement and replacement of the constituents already deposited in the mold to the extent that the original adhesion between the billet and the inner surface will be destroyed and the original billet will be transformed into the new piece.

The rear end of the piece will accordingly be constantly augmented with new subsidiary sections while its forward end travels through the columnar mold and eventually comes into contact with the mold's forward wall. It is of advantage to position a sensor in this vicinity that will emit a signal when the new piece is finished. The piece will now be cooled to solidify it, with shrinkage decreasing its diameter to produce a gap between its outer surface and the inner surface of the mold. The piece will accordingly be extremely easy to remove with a compressed fluid such as air.

The method in accordance with the invention is especially appropriate for processing waste plastic into new products. The waste must be broken up into small pieces and thoroughly mixed to be smoothly supplied to the extruder. In addition to the thermoplastic constituents—those based on polyolefins and polyvinyl chloride for example—the blend can contain such non-thermoplastic constituents as mineral fillers and/or waste rubber. The product's color can be adapted to the requirements of each specific application just as readily as can its mechanical, thermal, and chemical properties. The starting materials can be of any form: moldings and imprinted or unimprinted sheet for example.

The extruder in the generic device accordingly has in accordance with the invention only one screw, which is coaxial with the outlet and the mold. Ideally, the rotation will be superimposed over the force that expels the billet. The ratio between the open diameter $D1$ of the outlet and the free diameter $D2$ of the extruder should preferably be between 0.3 and 0.8.

It has been demonstrated to be of advantage for the same reason for the outlet to be circular. This feature promotes the desired rotation of the billet around its axis. The ratio between the length and the diameter of the outlet should also be as small as possible and should nor exceed 1.

The extruder should if possible not have any degassing device. The bubbles of air or gas expelled from such an embodiment along with the billet are surprisingly not uniformly distributed over the product's cross-section. They are confined to the vicinity of the core, which is accordingly surrounded by a completely non-porous outer zone. The width of this zone is approximately constant over the circumference, and the zone is optically distinctly different from the core. No blowholes can be observed in the vicinity of the surface. The piece's surface can, rather, be of any texture, which is a significant advantage from the aspect of esthetics. The cross-sectional design hereintofore described also means particularly satisfactory buckling and bending strengths in terms of the product's weight.

In addition to the aforesaid type of mold, at least two additional molds can be associated with one extruger, each mold traveling by the extruder's outlet and stopping in front of it as desired. This approach considerably accelerates the manufacturing process in that one mold is always in the emptying position, one in the charging position, and one in the cooling position.

The individual molds in such an embodiment can revolve in a device that rotates around an axis paralleling the axis of the extruder. This system will simplify the engineering of the drive mechanism that moves the separate molds in relation to one another.

The rotating device can be immersed at least up to its axis in water, with the extruder positioned above the surface of the water next to a receptacle for the pieces. Such a design will be compact and space-saving and will provide an especially satisfactory potential for completely automating manufacture of the products.

A columnar piece in accordance with the invention can have almost any cross-section desired. Not only circular but stellate and polygonal cross-sections can easily be created. The edges of rectangular cross-sections can be of any shape-with convex or concave curves for example. It accordingly becomes possible to produce what is called profile board, which has tongues and grooves that allow it to be joined together into large surfaces, to almost zero tolerance. The ratio of the depth to the width of such pieces can easily be between 1:4 and 1:6.

The mold employed in the method in accordance with the invention can be very simple, a thin-walled cylinder of metallic material for example. It is practical not to cool the mold with an ancillary coolant until its inner surface is uniformly wet with constituents of the billet. This approach will ensure that the product will exhibit a consistent inner and outer design over its total length. The product can then be cooled by active means, by directly immersing the mold and its contents in water for example. The product's non-porous outer zone will ensure continuous cooling and solidification of the areas that determine dimensional stability. The piece can soon be removed from the mold, which is a major advantage from the aspect of economics.

The preferred embodiments of the present invention will now be described with reference to the accompanying drawings.

DESCRIPTION OF THE PREFERRED EMBODIMENT

Figure 1:
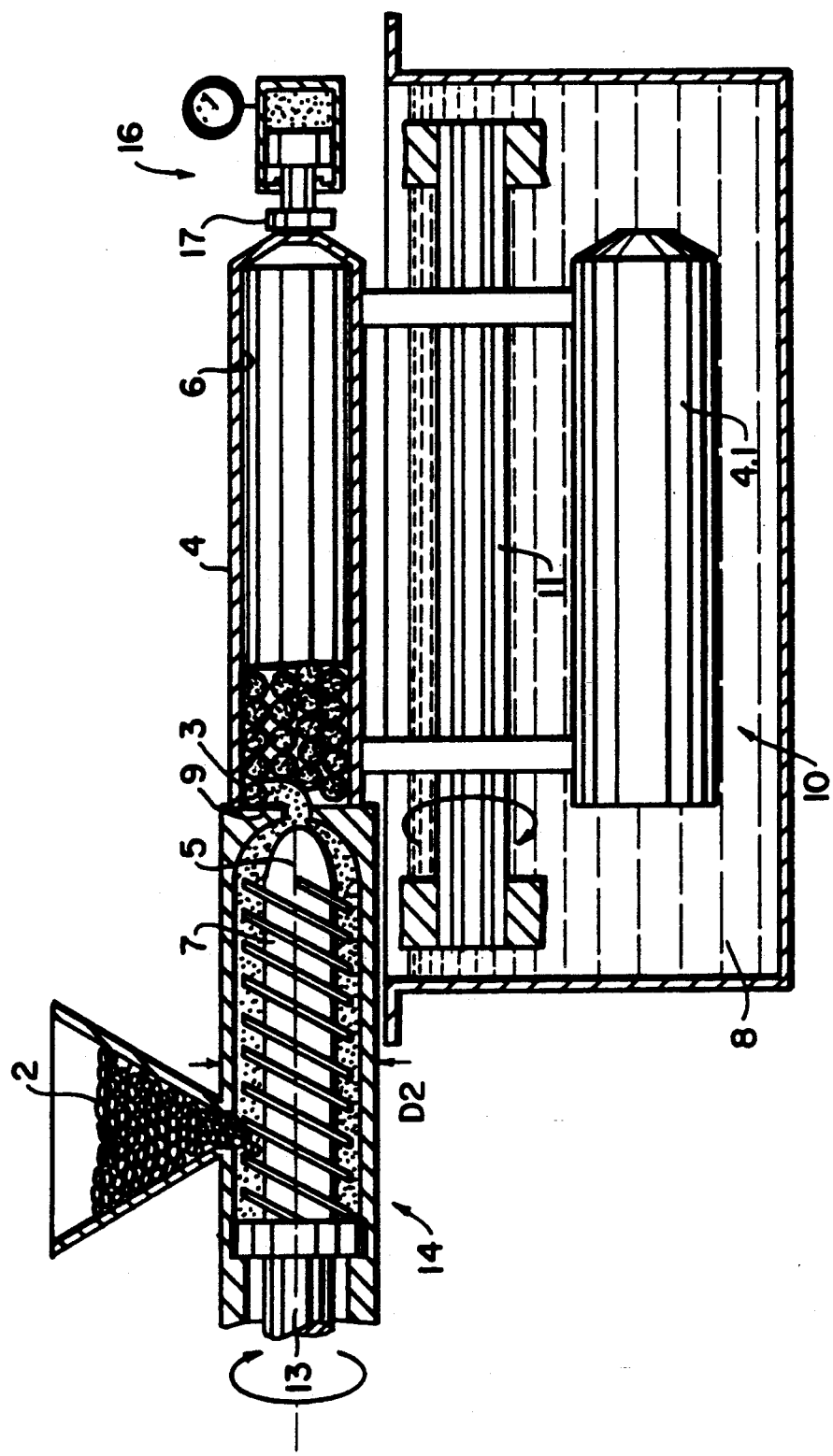
FIG. 1 is a schematic longitudinal section through an embodiment of a device for carrying out the method in accordance with the invention.
Figure 2:
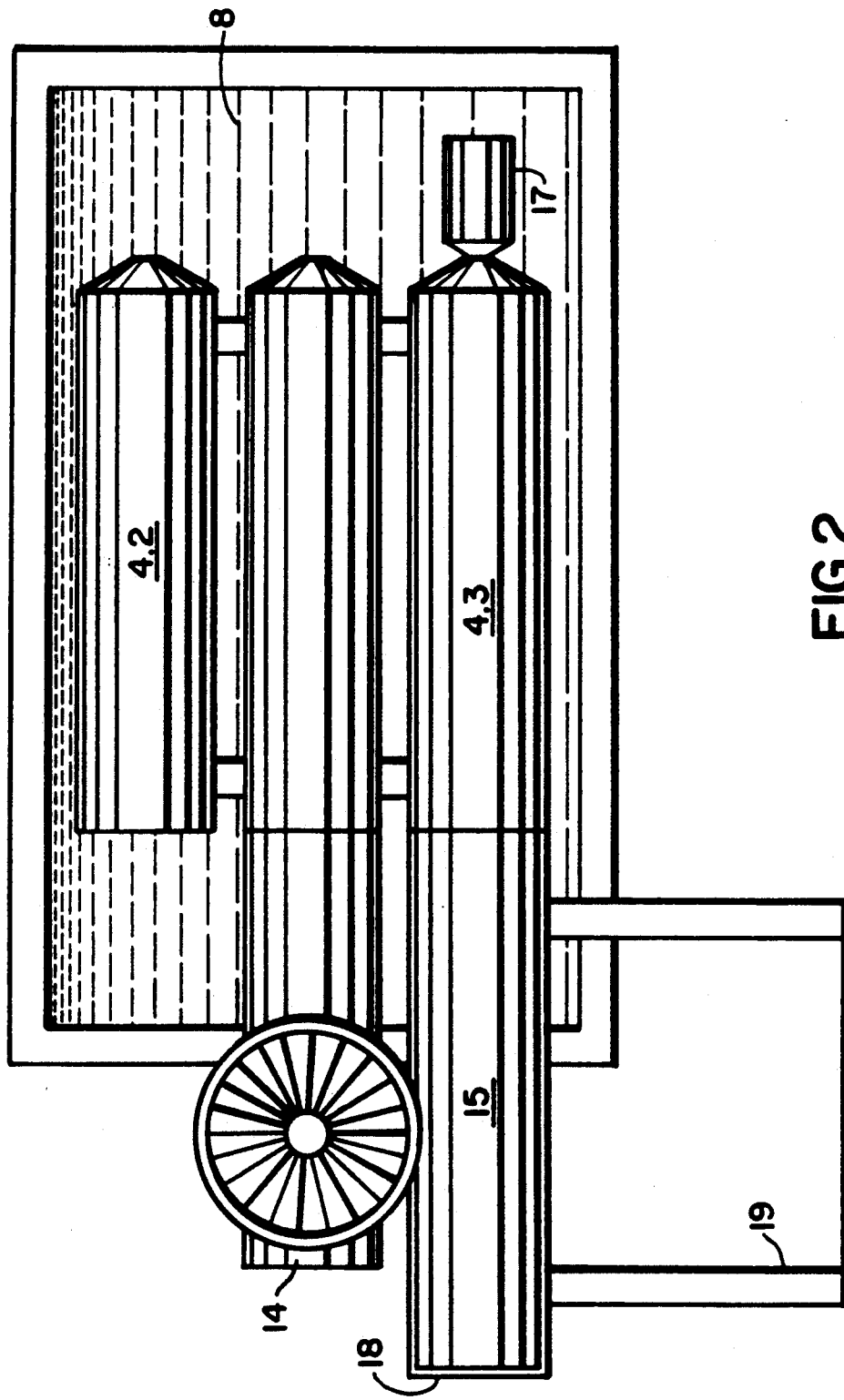
FIG. 2 is a top view of the device illustrated in FIG. 1.

The device illustrated in FIGS. 1 and 2 consists of an extruder 14 positioned above a tub 8 of water.

The extruder 14 has a housing accommodating a screw 7 that rotates on a driveshaft 13. Granulated plastic 2 enters the extruder from a hopper at the left, and the threads around screw 7 force the material constantly to the right. The housing has an inside diameter D2 that decreases to a diameter D1 at the output end in the vicinity of an outlet 9. The plastic 2 that enters from the hopper at the left can accordingly not travel through the extruder 14 unaltered but is exposed to thorough kneading, resulting in melting and thorough blending as it travels through the device. The ratio of diameter D2 to diameter D1 is approximately 3. The plastic leaving outlet 9 is accordingly in the form of an essentially homogeneous and viscous billet rotating and traveling toward the right.

Downstream and to the right of extruder 14 is a mold 4 in the form of a thin-walled metal cylinder. The mold is forced against the downstream end of the extruder by a pressure-generating device 16. The mold is coaxial with outlet 9 and screw 7. It is mounted in a device 10 that secures not only mold 4 but other molds 4.1 to 4.3 as well and rotates around an axis 11 paralleling the axis of extruder 14. The individual molds accordingly revolve past the outlet 9 from the extruder and can stop in front of it as desired. The molds in rotating device 10 are all columnar and are charged concentrically with the axis from the left end. As long as this latter condition is ensured, they can also have different cross-sections.

Rotating device 10 is immersed in tub 8 with its axis 11 below the surface of the water. The water can be room-temperature.

Above tub 8 and next to extruder 14 is a receptacle 15 for finished pieces 1, which are in the present case expelled from occupied mold 4.3 by compressed air injected through a nozzle 17 into the mold's right end (in the direction indicated by the arrow). A stop 18 accurately positions the expelled pieces in receptacle 15. The stop can then be pivoted down around its axis (in the plane of projection) to allow the intercepted piece to enter an assembling device 19, e.g., a shipping pallet or something similar.

Figure 3:
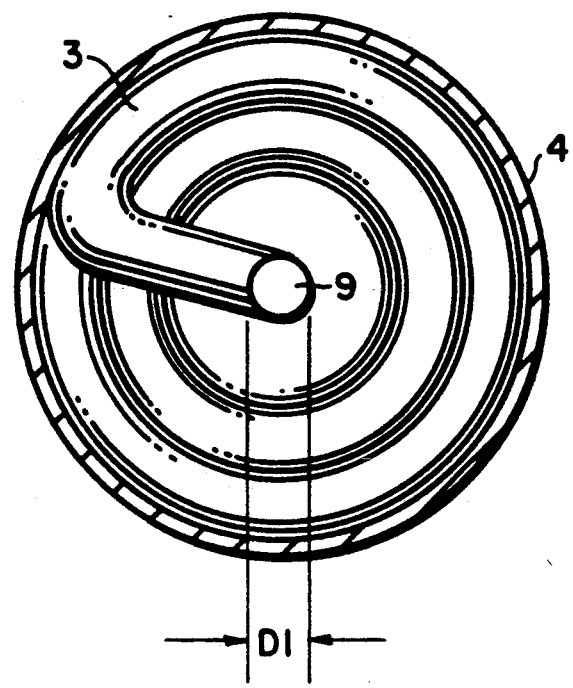
FIG. 3 is an end view illustrating the principle involved in introducing the billet into the mold.
Figure 4:
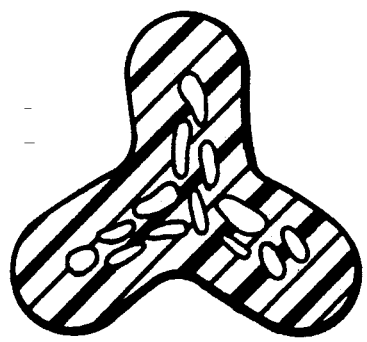
FIGS. 4 through 7 are cross-sectional views illustrating different examples of columnar pieces obtainable with the method in accordance with the invention.
Figure 5:
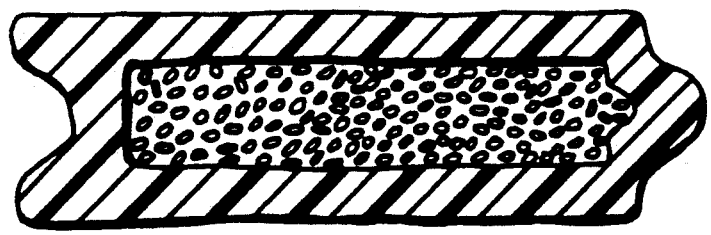
Figure 6:
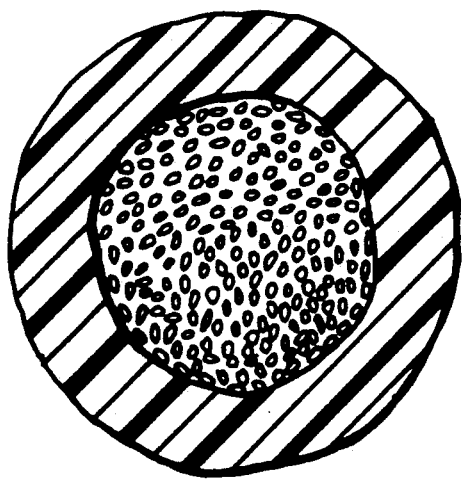
Figure 7:
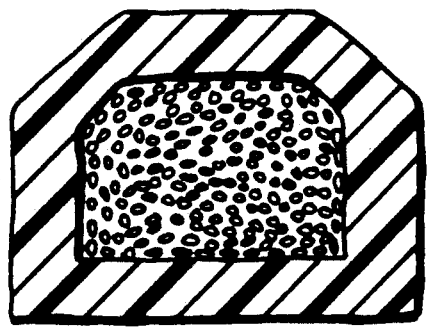

FIG. 3 schematically illustrates how a billet 3 is introduced into a mold 4. Billet 3 arrives through the outlet 9 from extruder 14 rotating around its axis and moving forward toward the center of the downstream end of mold 4, which is surrounded by a rigid inner surface and positioned stationary in relation to outlet 9. Billet 3 is in an easily deformable state and rests subject to gravity initially below outlet 9 against the inner surface of mold 4, where a certain mutual adhesion between it and mold 4 occurs due to the billet adhesive properties. Due to the pressure of additional constituents of billet 3 as they arrive and revolve around its axis, a deposit will continue to occur in the direction of the circumference of mold 4, resulting in mutual adhesion with inner surface 6 and with the already deposited constituents of billet 3. The originally available space between the deposited constituents of billet 3 and outlet 9 will accordingly become completely occupied, and the already deposited constituents will be displaced into still available space, creating the initial subsidiary section of the columnar piece. The original adhesion against the inner surface 6 of mold 4 will simultaneously be destroyed, and, although new constituents of piece 1 will continually come into existence at the left, the right end of the piece will become increasingly displaced to the right, in the direction indicated by the outlined arrow inside mold 4. This process will continue until the mold 4 is completely charged and the inner surface is continuously and uniformly covered with constituents of billet 3. The attainment of this state will be indicated by a sensor 20 that communicates electrically with a switch that, when this state is attained, interrupts the supply of billets and rotates device 10 around its axis. Hot and charged mold 4 enters the water in tub 8, and the charged mold 4.1, which has already been cooled in the water, is positioned for discharging in front of receptacle 15, while another mold, which has already been discharged, is positioned for charging. The extruder 14 can now be engaged again, and the mold 4.3 in the discharging position discharged, introducing the next cycle.

FIGS. 4 through 7 illustrate different inner and outer cross-sections of columnar pieces manufactured with the method and device in accordance with the invention. Characteristic of all these pieces is that, in addition to an almost non-porous zone around the edge with an essentially constant width, they have almost a foam structure at the core. The surface is completely intact and can have any desired texture, which is a significant aesthetic advantage. They can easily be scored to imitate leather or wood.

There has thus been shown and described a novel method of and device for producing a columnar shaped piece which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a method of producing a columnar shaped piece whereby a blend of essentially thermoplastic particles is melted into a billet, introduced into a mold, looped into layers inside the mold, and transformed into a piece, subsequent to which the piece is solidified by cooling and removed, the improvement wherein the billet (3) is rotated essentially horizontally around its axis while it is being introduced into the mold (4) at one end and brought to rest inside the mold against the inner surface (6) thereof in the circumferential direction, and wherein the billet continues to be introduced until the inner surface is continuously and uniformly covered with constituents of the billet.

2. The method defined in claim 1, wherein the billet (3) is rotated by the screw (7) in an extruder (14).

3. The method defined in claim 1, wherein, once its inner surface (6) is continuously and uniformly covered, the mold (4) is cooled with an auxiliary coolant.

4. The method defined in claim 3, wherein the mold (4) is cooled by dipping it into a tub (8) of water.

* * * * *